July 7, 1964
R. J. HEILAND
3,140,124
ACCUMULATOR MEANS
Filed June 8, 1962
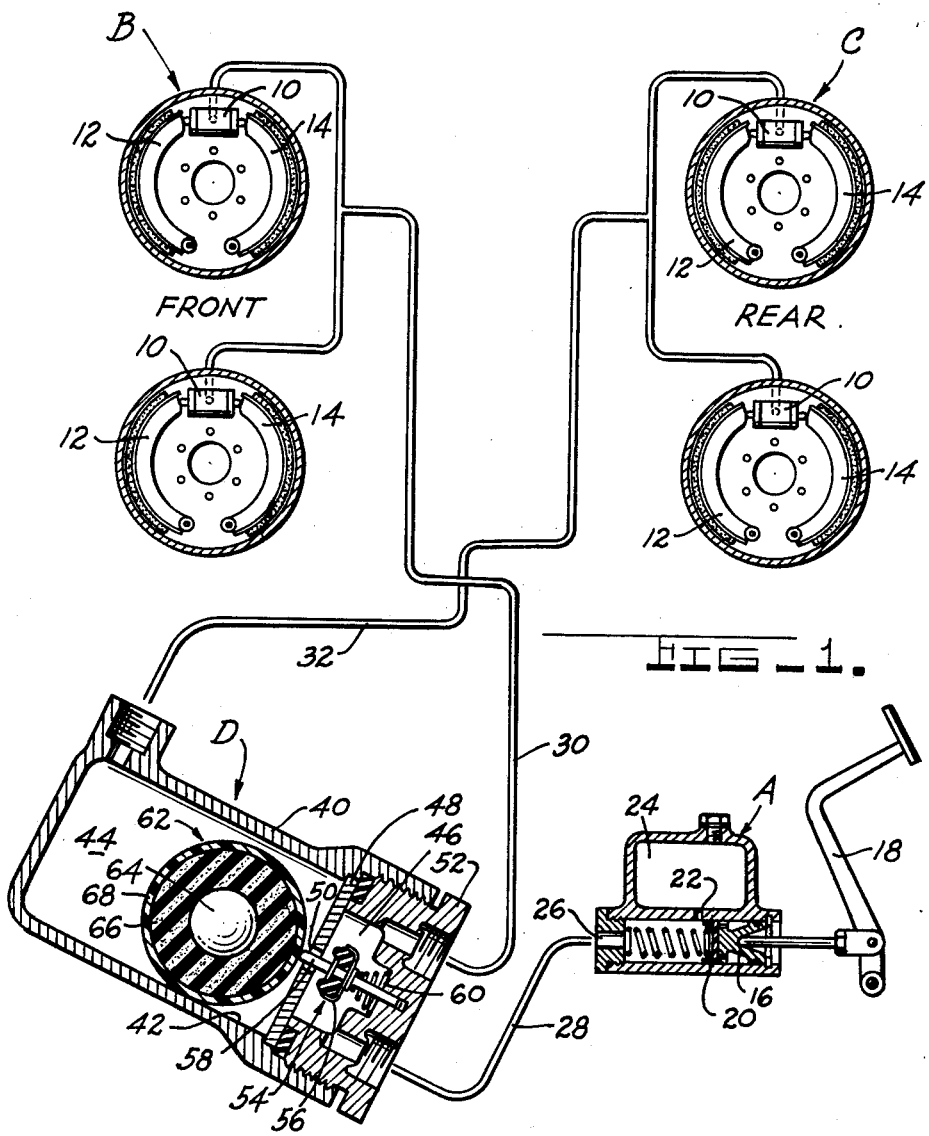
FIG_1.
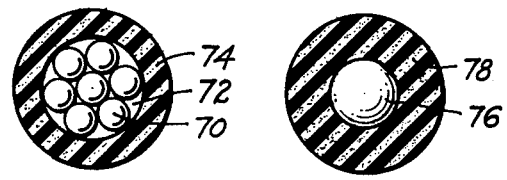
FIG_2.  FIG_3.
INVENTOR.
ROBERT J. HEILAND.
BY
William P. Hickey
ATTORNEY.

United States Patent Office 3,140,124
Patented July 7, 1964

3,140,124
ACCUMULATOR MEANS
Robert J. Heiland, South Bend, Ind., assignor to The Bendix Corporation, South Bend, Ind., a corporation of Delaware
Filed June 8, 1962, Ser. No. 201,016
2 Claims. (Cl. 303—6)

The present invention relates to means for providing variable volume hydraulic fluid pressure chambers; and more particularly, to deceleration responsive shut-off valves for a hydraulic braking system and the like, which valves will automatically compensate for slight changes in volume in the isolated portion of the braking system.

An object of the present invention is the provision of a new and improved variable volume hydraulic chamber, whose volume increases with hydraulic fluid pressure, and which is devoid of movable walls and/or gas filled pockets which contact the hydraulic fluid.

Another object of the present invention is the provision of a new and improved deceleration responsive shut-off valve for hydraulic braking systems and the like having a positive shut-off valve which traps fluid in the driven braking system, and which shut-off valve is actuated by a resiliently pressure deformable deceleration responsive weight that is located in the isolated portion of the braking system.

The invention resides in certain constructions, and combinations, and arrangements of parts; and further objects and advantages of the invention will become apparent to those skilled in the art to which it relates from the following description of several preferred embodiments described with reference to the accompanying drawings forming a part of this specification, and in which:

FIGURE 1 is a schematic view of an automotive braking system that includes a deceleration sensing valve that is shown in section, and which embodies principles of the present invention;

FIGURE 2 is a cross sectional view of another embodiment of pressure deformable body intended to be used in the deceleration sensing valve shown in FIGURE 1; and FIGURE 3 is a cross sectional view similar to FIGURE 2 but showing still another embodiment of pressure deformable body intended to be used in the deceleration sensing valve shown in FIGURE 1.

The braking system shown in FIGURE 1 generally comprises a more or less conventional master cylinder A which is used to develop hydraulic pressure for the actuation of both the front and the rear wheel brakes of an automotive vehicle. The front and the rear wheel brakes B and C, respectively, may be of any suitable type that is actuated by means of pulsating fluid pressure motors, commonly called wheel cylinders 10 and which have movable elements or pistons which bias friction producing members out into engagement with rotating elements that are attached to the respective wheels of the vehicle. The front and the rear wheel brakes shown in the drawing are of the leading and trailing shoe type, wherein the leading shoe 12 of the brake has some degree of self-energization while the trailing shoe 14 has none. It should be understood, however, that braking structures, wherein both shoes are self-energized (have some degree of self-energization and/or servo action) can be utilized so long as the front and the rear wheel braking mechanisms are properly sized relative to each other.

The master cylinder A generally comprises a movable piston 16 that is actuated by means of the brake pedal lever 18. The piston 16 has a cup type seal 20 on its front face, and actuation of the lever 18 causes the seal to slide inwardly past a fluid compensating port 22 which communicates with the reservoir 24, and thereafter force fluid out of the outlet port 26. The outlet port 26 is communicated to both the front and the rear brake structures B and C, respectively, by means of the intercommunicating lines 28, 30 and 32 which lead to the various wheel cylinders of the brake structures.

During the deceleration of an automotive vehicle, a weight shift occurs which increases the percent of the weight of the vehicle which is supported by the front wheels, and decreases the percent of the weight of the vehicle which is supported by the rear wheels. The amount of braking torque required to slide any of the load bearing wheels of the vehicle is directly proportional to the load thereon; so that the proportion of the total braking effort of the vehicle which the front wheels can produce increases with the rate of vehicle deceleration, while the proporation of the total vehicle braking effort which the rear wheels can produce decreases with vehicle deceleration. It will further be understood that the braking torque which all conventional brake structures produce is generally proportional to their actuating force; so that it is necessary to constantly change the proportion of the actuating force to the front and rear wheel brakes, if it is desired, to cause the front and rear wheel brakes to begin to slide simultaneously at any and all rates of vehicle deceleration.

Generally, it is not feasible to build a device which will proportion the braking effort in a manner which exactly duplicates the change in braking capability of the front and rear wheels of the vehicle; and accordingly, it is an object of the present invention to provide a simple and inexpensive structure for splitting the actuating pressure to the front and rear wheel brakes in such manner as to closely approximate the actuating pressure which will produce simultaneous sliding of both the front and the rear wheels of the vehicle. Applicant provides his approximation by communicating pressure from the master cylinder A to both the front and the rear wheel brakes, respectively, until such time as a predetermined rate of vehicle deceleration is reached. This predetermined rate of vehicle deceleration will be selected to be below the rate of deceleration which causes the rear wheels to slide under moderately poor road conditions (as for example wet macadam). Ideally, the front and rear brake actuating hydraulic wheel cylinders will be sized relative to each other to slide the front and rear wheels simultaneously at the predetermined rate of vehicle deceleration. By so proportioning the front and the rear wheel brake structures, pressure from the master cylinder A causes both the front and the rear wheel brakes to start to slide simultaneously when the vehicle is driven under the road conditions which were previously preselected. When the vehicle is driven on a dry pavement, however, a higher rate of deceleration is possible prior to a sliding of the tires on the pavement; and this, of course, will cause a greater percentage of the vehicle weight to be shifted to the front wheels. Accordingly, the deceleration sensing valve D decreases the proportion of the master cylinder discharge pressure that is applied to the rear wheel breaks C at vehicle deceleration rates above the predetermined rate of vehicle deceleration to prevent the rear wheels from sliding at rates above the predetermined rate of vehicle deceleration.

The deceleration sensing valve D generally comprises a valve body 40 having a longitudinally extending internal chamber 42 that is divided into front and rear portions 44 and 46, respectively, by an internal partition member 48, having a centrally located valve port 50 therethrough. The partition member 48 is held in place by means of a threaded enclosure member 52 that is screwed into the end of the valve body 40 to effect a fluid type seal therewith. Pressure from the master cylinder outlet 26 is communicated to the rear portion 46 of the internal chamber 42 by means of intercommunicating line 28, and pressure from the rear portion 46 of the internal chamber is communicated directly to the front wheel brakes B of the vehicle by means of the interconnecting line 30. The rear wheel brakes C of the vehicle, however, are communicated to the front portion 44 of the internal chamber by means of the intercommunicating line 32; and a valve closure member or poppet 54 is positioned in the rear portion 46 of the chamber for abutment with the partition member 48 in the region surrounding the valve port 50 to close off communication between the front and rear portions 44 and 46 of the internal valve chamber 42. The poppet member 54 may be supported in any suitable fashion, and as shown in the drawings, is formed by means of an annular metal cup 56 that is suitably secured to a metal stem 58, adapted to extend through the valve port 50. The region within the cup and which surrounds the stem 58 is filled with a rubber material vulcanized in place to provide a suitable seal for engaging the partition member 48. The rear portion of the stem 58 is suitably supported and guided by the end closure member 52, and a coil spring 60 is positioned therebetween to provide a light biasing force, which will urge the poppet member 54 into engagement with the valve partition member 48.

Deceleration valve D is completed by means of a ball weight 62 which is positioned in the front proportion 44 of the valve chamber 42 for the purpose of engaging the valve stem 58 and overcoming the coil spring 60 to normally hold the poppet member 54 out of engagement with the partition 48. The internal chamber 42 of the housing member D is normally mounted in an inclined position, and with the axis of the valve body 40 generally in line with the longitudinal axis of the vehicle. In this position the surfaces of the internal chamber on which the ball 62 rests, slope downwardly and rearwardly toward the valve stem 58. The ball 62 is provided with such weight as will hold the poppet member 54 out of engagement with the partition member 48 at rates of vehicle deceleration that are below the predetermined or preselected rate of vehicle deceleration previously referred to. The angle of inclination of the valve body 40, and the weight of the ball 62 are so selected therefore as to cause the ball 62 to roll up the incline provided by the sidewalls of the chamber 44 at the predetermined rate of deceleration to allow the poppet member 54 to close the valve port 58 and thereby isolate the master cylinder A from the rear wheel brakes C. It will therefore be seen that the operator thereafter is prevented from increasing hydraulic pressure to the rear wheel brakes C. Isolation of the rear brakes C from the master cylinder thereby permits the operator to exert as much actuating force on the front wheel brakes as is possible without sliding the front wheels, while at the same time holding a safe lesser actuating pressure on the rear wheel brakes.

One of the difficulties that is involved with deceleration sensing valves of the type so far described is that temperature changes of the brake structures themselves produce an expansion of their hydraulic elements which causes the pressure in the front portion 44 of the internal valve chamber to decrease after the time that valve closure member 54 closes off the valve port 50. This is beneficial during severe brake application in that it reduces the actuating pressure to the rear wheel brakes in a manner corresponding with the load shift-off of the rear wheel brakes. In most instances, however, the reduction in pressure in the rear isolated portion of the braking system is such as to be considerably more than the load shift off of the rear wheels. A definite improvement is therefore obtained by providing a pressure accumulator effect for the isolated rear portion of the hydraulic system after the valve closure member 54 closes off the interconnecting valve port to partially offset the loss in pressure due to thermal expansion. According to principles of the present invention this accumulator effect is conveniently obtained by designing the ball weight 62 in a manner to resiliently decrease in size as hydraulic pressure is applied thereto.

The ball weight 62 can be made resiliently compressible in any suitable manner. In the embodiment shown in FIGURE 1, the ball weight 62 comprises a centrally located steel ball 64 having a suitable foam type plastic formed around the ball 64 and covered by means of a resilient, impervious, plastic layer 68, which prevents impregnation of the plastic foam material 66 with the surrounding hydraulic brake fluid. The outer plastic impervious layer 68 may not in all cases be necessary provided the plastic foam layer 66 is made of a material which will not be dissolved by the hydraulic brake fluid, and provided the plastic foam layer 66 is of the type whose individual cells are not interconnected so as to absorb the hydraulic fluid. The gas filled cells of the plastic foam material 66 act as tiny accumulators which collectively provide the necessary accumulator effect to offset the changes in volume in the rear braking system C that is produced by thermal expansion.

As previously mentioned, the invention is not limited to any particular type of resilient ball weight structure which will provide both the deceleration sensing function of the device, and the accumulator function for offsetting thermal expansion; and still other embodiments will occur to those skilled in the arts. Two of such embodiments are shown in FIGURES 2 and 3 of the drawings.

In the embodiment shown in FIGURE 2, the pneumatic filled chamber or cavity, which provide the necessary accumulator effect, is provided by means of a plurality of small steel balls 70 which form the heavy core for the ball weight, and which provide voids between the balls which voids 72 provide the necessary gas filled volume. The small steel balls 70 are surrounded by a resilient envelope 74, which may in some instances merely seal off the high surrounding hydraulic fluid from the pneumatic filled spaces 72. Preferably, however, the envelope 74 will be of sufficient thickness and of such a resilient nature as is provided, for example, by a plastic foam material; so that it can flow into and out of the spaces 72 without appreciably changing the spherical nature of the external surface of the ball weight. As in the embodiment shown in FIGURE 1, the surrounding hydraulic fluid must be kept from penetrating the gas filled voids 72, as well as any voids which are provided in the resilient envelope 74; and in those instances where the resilient envelope 74 is not impervious to the hydraulic fluid, a surrounding pervious layer will be required.

The embodiment of ball weight shown in FIGURE 3 is generally similar to that shown in FIGURE 1 and differs principally therefrom in that its center steel ball 76 is surrounded by an impervious plastic foam envelope 78 whose gas filled voids are entirely separated one from each other; so that layer 78 does not require an additional external impervious layer to prevent impregnation of the voids by the hydraulic fluid.

It will be understood that the manner in which applicant provides an accumulator effect can be utilized in other than deceleration sensing valves, and that the invention provides a very convenient and economical means of providing an accumulator effect which does not require sealing structures that are subject to large pressure differentials. In those instances where the weight of the accumulator body is not important, the heavy internal steel ball or equivalent weight of structure will not be necessary, and the structure may take on the form of an impervious envelope which surrounds a centrally located void that is filled with a gas. In some instances it may be advantageous to raise the pressure of the internal void above atmospheric pressure, in order that its size may be reduced. In still other instances where hydraulic displacement is not a troublesome factor, the gas filled void may be at atmospheric pressure and an initial displacement of the hydraulic fluid utilized to compress the gas to the desired accumulator pressure level.

The braking system shown in FIGURE 1 is operated by depressing the brake pedal lever 18, which causes the piston 16 to slide the cup seal 20 past the compensating port 22, and thereafter force fluid out through the intercommunicating line 28 to the rear portion 46 of the internal chamber of the deceleration sensing valve D. Pressure from the rear portion 46 of the internal chamber is communicated directly to the front wheel brakes B through the intercommunicating line 30; so that the wheel cylinders 10 of the front brakes B are operated directly by pressure that is developed in the master cylinder A.

In the normal condition of the deceleration sensing valve D, ball weight 62 bears against the stem 58 of the poppet 54 with sufficient force to overcome the coil spring 60 and hold the poppet 54 out of engagement with the partition member 48. This permits the pressure from the master cylinder to be communicated through the port 50 and intercommunicating line 32 to the wheel cylinders 10 of the rear brakes C. During an initial stage of braking, therefore, master cylinder pressure is communicated directly to both the front and rear wheel brakes. When the combined efforts of the front and rear wheel wheel brakes produce a deceleration of the vehicle which approaches the predetermined deceleration at which the deceleration sensing valve D is designed to close off the compensating valve port 50, the ball weight 62 rolls up the sidewalls of the front portion 44 of the internal valve chamber to allow the poppet member 54 to abut the partition 48 and thereby close off valve port 50. Thereafter actuating pressure from the master cylinder A is completely valved off from the rear brakes C, so that any additional pressure that is developed in the master cylinder A by the operator is only communicated to the front wheel brakes B.

During the time that pressure was being built up in the front portion 44 of the internal valve chamber pressure, the ball weight 62 was reduced in size and the pressure of the gasses in the individual cells of the plastic foam layer 66 was increased. During the time that the poppet member 54 seals off the valve passage 50, therefore, thermal expansion in the rear brake structure C tends to diminish pressure in the front portion of the internal chamber 44, and this in turn is partially offset by an expansion in the size of the ball weight 62. There is produced, therefore, during hard application of the brakes, a slight decline in the actuating pressure to the rear brake structure C, after the time that the poppet member 54 closes off the port 50. This decline will be generally proportional to the severity of the brake application. It has been found that this gradual reduction of brake application pressure to the rear brake structures corresponds generally to the load shift off of the rear wheels which occurs during a severe brake application. The present invention, therefore, among other things provides a deceleration sensing valve for an automotive hydraulic braking system which is very inexpensive and yet closely simulates the theoretically required proportioning that is necessary to produce a simultaneous sliding of the front and rear wheels.

When it is desired to reduce the brake application, a reduction in force upon the foot pedal lever 18 decreases the pressure in the front brake structures B until such time as the deceleration forces upon the ball weight 62 have diminished to the point where the force of gravity exceeds the deceleration forces by an amount equal to the force of the spring 60 and the pressure differential across the poppet 54. Thereafter the poppet 54 opens to reduce actuating pressure to the front and rear wheel brakes simultaneously. The deceleration at which the valve port 50 opens may be referred to as the opening point for the deceleration sensing valve, and the opening point will always be below the closing set point previously referred to because of the pressure forces upon the poppet 54. Once the operator decreases the master cylinder pressure below the opening set point of the valve, the rear brake structures C are again brought into communication with the master cylinder A, so that the pressures in both the front and rear wheel brakes are thereafter decreased simultaneously.

It will be apparent that the objects heretofore enumerated, as well as others, have been accomplished and that there has been provided, not only a simple type of accumulator, but a simple deceleration sensing valve structure whose control of the front and rear brakes of an automotive vehicle closely simulates ideal conditions.

While the invention has been described in considerable detail, I do not wish to be limited to the particular embodiments shown and described; and it is my intention to cover hereby all novel adaptations, modifications and arrangements thereof which come within the practice of those skilled in the art to which the invention relates.

I claim:

1. A deceleration sensing valve for use in a hydraulic braking system having front brake and rear brake operating fluid pressure motors that are actuated by pressure from a master cylinder, and the like: said deceleration sensing valve having a valve body with an internal axially extending chamber therein which extends in the normal forward line of motion of the vehicle, a partition wall across said chamber, said partition wall having an opening therethrough and a valve seat surrounding said opening on the rear side of said partition, a poppet member rearwardly of said partition and normally biased toward said valve seat, a pin extending from said poppet member through said opening into the chamber forwardly of said partition member, and a ball in said chamber forwardly of said partition member for movement toward and away from said pin, said chamber being inclined vertically in a forward direction so that the weight of said ball normally holds said poppet member off of said seat, the portion of said chamber on the rear side of said valve seat having an inlet port for communication to said master cylinder, and the portion of the chamber on the front side of said partition member having an outlet port for communication to one of said front and rear brake operating fluid pressure motors, said ball being of a resilient material and having at least one internal gas filled chamber therein which is isolated from the exterior surface of said ball and which causes the volume occupied by said ball to be resiliently reduced by pressure in said housing chamber.

2. In a hydraulic braking system having front brake and rear brake operating fluid pressure motors that are actuated by pressure from a master cylinder and the like: a deceleration sensing valve having a valve body with an internally axially extending chamber therein which extends in the normal forward line of motion of the vehicle, a partition wall across said chamber, said partition wall having an opening therethrough and a valve seat surrounding said opening on the rear side of said partition, a poppet member rearwardly of said partition and normally biased toward said valve seat, a pin extending from said poppet member through said opening into the chamber forwardly of said partition member, and a ball in said chamber forwardly of said partition member for movement toward and away from said pin, said chamber being inclined vertically in a forward direction so that the weight of said ball normally holds said poppet member off of said seat, the discharge pressure from said master cylinder being communicated to said front brake operating fluid pressure and to the portion of said chamber on the rear side of said partition, and the portion of the chamber on the front side of said partition member being communicated to said rear brake operating fluid pressure motor, said ball including a foam material whose pores are sealed off from the exterior surface of said ball to form a plurality of gas filled chambers whose volume is resiliently reduced by pressure in said chamber.

References Cited in the file of this patent
UNITED STATES PATENTS

| | | |
|---|---|---|
| 2,357,386 | Dick | Sept. 5, 1944 |
| 3,035,870 | Beatty | May 22, 1962 |

FOREIGN PATENTS

| | | |
|---|---|---|
| 1,137,430 | France | Jan. 14, 1957 |